(12) United States Patent
Bagwell et al.

(10) Patent No.: US 11,041,779 B1
(45) Date of Patent: Jun. 22, 2021

(54) SYSTEMS AND METHODS FOR DETECTING LEAKS IN A COMPRESSED GAS SYSTEM

(71) Applicant: Synapse Wireless, Inc., Huntsville, AL (US)

(72) Inventors: Coleman D. Bagwell, Madison, AL (US); James Alexander Mabry, Madison, AL (US); Daniel Josiah Barnes, Harvest, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 304 days.

(21) Appl. No.: 16/128,025

(22) Filed: Sep. 11, 2018

(51) Int. Cl.
*G01M 3/28* (2006.01)
*G08B 21/18* (2006.01)

(52) U.S. Cl.
CPC ............ *G01M 3/28* (2013.01); *G08B 21/182* (2013.01)

(58) Field of Classification Search
CPC .... F17D 5/02; G01M 3/28; F17C 2250/0647; F17C 2221/033; F17C 2223/0123; F17C 2223/033; F17C 2223/035; F17C 2225/0123; F17C 2225/033; F17C 2225/035; F17C 2250/034; F17C 2250/036; F17C 2250/043; F17C 2250/0473; F17C 2260/038; F17C 2270/07; F17C 5/06; F17C 7/00; F17C 2223/036; F17C 2250/0443; F17C 2201/0109; F17C 2205/0323; F17C 2205/0338; F17C 2205/0352; F17C 2225/036; F17C 2250/0439; F17C 2270/0168; F17C 2270/0171; F17C 11/00; F17C 11/005; F17C 11/007; F17C 13/025; F17C 13/026; F17C 13/084; F17C 13/10; F17C 2201/0104; F17C 2201/0119; F17C 2201/032; F17C 2201/054; F17C 2201/056; F17C 2203/0629; F17C 2205/0111; F17C 2205/0126; F17C 2205/0146; F17C 2205/0176; F17C 2205/0332; F17C 2205/0335; F17C 2205/0341; F17C 2221/012; F17C 2221/013;

(Continued)

(56) References Cited

U.S. PATENT DOCUMENTS 3,791,197 A 2/1974 Eukuda
3,839,900 A 10/1974 Fukuda (Continued)

*Primary Examiner* — Mohammad K Islam
(74) *Attorney, Agent, or Firm* — Maynard Cooper & Gale, P. C.; Jon E. Holland

(57) ABSTRACT

A monitoring system for a facility can automatically determine the presence of leaks in a compressed gas system at the facility. The monitoring system can use information from sensors in the compressed gas system to determine if there is a constant flow of gas in the system that can be indicative of a leak in the system. The monitoring system can process flow measurements from the sensors to determine minimum gas flow amounts for a series of time windows. The minimum gas flow amounts are then averaged to generate an average minimum gas flow amount. If the average minimum gas flow amount is greater than an average threshold, a variance of the minimum gas flow amounts can be determined. If the determined variance is less than a variance threshold, the average minimum gas flow amount is determined to correspond to a leak in the compressed gas system.

22 Claims, 6 Drawing Sheets

(58) Field of Classification Search
CPC .......... F17C 2221/014; F17C 2221/037; F17C 2223/0161; F17C 2227/0135; F17C 2227/0157; F17C 2227/0302; F17C 2227/0323; F17C 2227/0337; F17C 2227/0355; F17C 2227/0383; F17C 2227/043; F17C 2227/044; F17C 2250/032; F17C 2250/0421; F17C 2250/0626; F17C 2260/012; F17C 2260/037; F17C 2260/04; F17C 2260/044; F17C 2260/046; F17C 2265/061; F17C 2265/065; F17C 2265/07; F17C 2270/0139; F17C 2270/0147; F17C 2270/0149; F17C 2270/0184; F17C 2270/0518; F17C 5/00; F17C 5/007

See application file for complete search history.

(56) References Cited

U.S. PATENT DOCUMENTS

| | | | |
|---|---|---|---|
| 4,571,986 A | 2/1986 | Fujii et al. | |
| 4,625,545 A | 12/1986 | Holm et al. | |
| 5,866,803 A * | 2/1999 | Namba | G01M 3/2807 73/40.5 R |
| 8,885,513 B2 | 11/2014 | Ewing | |
| 9,374,874 B1 | 6/2016 | Ewing | |
| 9,404,623 B2 * | 8/2016 | Kapoor | F17C 5/06 |
| 9,759,630 B2 * | 9/2017 | Xu | G01M 3/228 |
| 9,995,647 B2 * | 6/2018 | Huseynov | G01M 3/24 |
| 10,049,552 B1 | 8/2018 | Ewing et al. | |
| 10,792,784 B2 * | 10/2020 | Sakugawa | B24B 49/08 |
| 2009/0013765 A1 * | 1/2009 | Nakano | F17D 5/02 73/40.5 R |
| 2009/0223129 A1 * | 9/2009 | De Radigues | F17D 5/02 48/194 |
| 2012/0247189 A1 | 10/2012 | Finlay | |
| 2013/0318917 A1 * | 12/2013 | Nilsson | G01M 3/32 53/267 |
| 2014/0005958 A1 * | 1/2014 | Baliga | G06N 3/02 702/51 |
| 2014/0231531 A1 * | 8/2014 | van der Donk | F23N 5/242 237/12 |
| 2016/0011072 A1 * | 1/2016 | Hale | G01F 1/662 702/48 |
| 2016/0356425 A1 * | 12/2016 | Fanger | B60K 15/03006 |
| 2017/0114958 A1 * | 4/2017 | Otaki | F17C 13/025 |
| 2018/0180224 A1 * | 6/2018 | Pringle | F17C 13/02 |

* cited by examiner

SYSTEMS AND METHODS FOR DETECTING LEAKS IN A COMPRESSED GAS SYSTEM

BACKGROUND

The present application generally relates to systems and methods for detecting leaks in a compressed gas system.

In a compressed gas system, leaks can be a significant cause of energy loss over time. Accurately detecting the presence and location of leaks in a compressed gas system and assessing the impact of the leaks on the performance and costs of the system can be difficult. In this regard, the leaking gas typically does not leave a visible indication of the leak. In addition, if the amount of the leak is small, the impact of the leak to the overall performance of the compressed gas system may not be noticeable, but over time, the leak may be costly in terms of energy loss. Current leak detection techniques generally require the use of manually performed ultrasonic inspections that can be expensive.

SUMMARY

The present application generally pertains to a monitoring system that can detect the presence of a leak in a compressed gas system. The detected leak can then be identified as being within a manufacturing, industrial or commercial environment or department of a facility. Further, the detected leak may be identified as being within a specific region of the department (e.g., downstream of a sensor). The compressed gas system can use a pneumatic control system to control the generation and distribution of compressed gas for use (e.g., by equipment and/or devices) in the facility. The pneumatic control system can be either a stand-alone wireless sensor network or can be incorporated within an existing wireless sensor network (e.g., a lighting control system) used at the facility. The pneumatic control system can have a plurality of sensors that communicate with a server computer and can provide measurements to the server computer indicative of the gas flow in the compressed gas system at the corresponding location of the sensor. The "flow" measurements from the various locations of the compressed gas system can be provided to the monitoring system, which may be part of the pneumatic control system or may be a separate system (either a stand-alone system or part of another control system at the server computer) that operates in conjunction with the pneumatic control system. The monitoring system can then process the flow measurements from each sensor to determine if a leak is present at the location in the compressed gas system corresponding to the sensor.

Typically, in a compressed gas system, the gas flow through the system can be characterized as a series of pulses (e.g., a large flow of gas followed by no flow of gas). The detection of a constant gas flow in the compressed gas system can be indicative of a leak caused by malfunctioning equipment (e.g., a stuck valve), improperly connected equipment, a defective seal, a hole in a pipe or conduit of the compressed gas system, or other system problems. For each sensor corresponding to a location in the compressed gas system, the monitoring system can divide the flow measurements from the sensor into a plurality of time windows each of which has a predetermined duration and contains one or more flow measurements. The monitoring system can process the flow measurements over a predetermined time period (e.g., 1 day, 1 week, etc.) when dividing the flow measurements into time windows. The predetermined time period used by the monitoring system when dividing the flow measurements into windows can be a rolling time period (e.g., the monitoring system uses the flow measurements from the prior time period to generate the time windows even if the flow measurements have already been processed) or a fixed time period (e.g., the monitoring system uses the flow measurements since the last time the monitoring system generated the time windows). Then, for each time window, the monitoring system can determine the minimum gas flow measurement for the corresponding time window. The minimum gas flow for each of the time windows can then be averaged to determine an average minimum gas flow (over the predetermined time period). If the average minimum gas flow is greater than zero (or a preselected threshold value), the non-zero minimum gas flow may be indicative of a leak in the compressed gas system.

To validate the leak determination from the average minimum gas flow calculation, a variance of the minimum gas flows for each of the time windows can be determined. If the variance is greater than a threshold value, then the average minimum gas flow determination is discarded and a determination is made that a leak is not present. However, if the variance is less than (or equal to) the variance threshold, then the monitoring system accepts the average minimum gas flow as being an accurate assessment of a leak in the compressed gas system. Once the leak is validated or confirmed, the monitoring system can determine the amount of gas leaking based on the average minimum gas flow and can identify an area of the corresponding department or environment where the leak may be located (e.g., an area of the compressed gas system corresponding to the location of the sensor). A user can be notified and/or remedial measures can then be taken to address the leak using the location and amount information provided by the monitoring system.

In one embodiment, flow sensors are positioned throughout a facility to measure the air flow at different points, such as each branch of a compressed gas system. Leaks can be typically characterized as occurrences of continuous flow, whereas normal use is generally characterized as pulsed flow. At each measurement location, samples are taken over a time period, which is divided into various time windows. For each time window, the minimum flow is determined, and the minimum values over multiple windows are averaged to determine the likely amount of flow leaking from the compressed gas system at that location. The variance of the minimum values is also determined. If the variance is below a threshold, then the average minimum value determination is deemed an accurate measurement of leakage. However, if the variance is above a threshold, then the average minimum value determination is deemed unreliable and discarded. Calculating leakage using the average minimum value determination provides for an accurate assessment of leakage despite fluctuations in normal usage that might otherwise affect the accuracy of the results.

One advantage of the present application is that existing flow sensors in a compressed gas system can be used to detect a leak in the compressed gas system.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
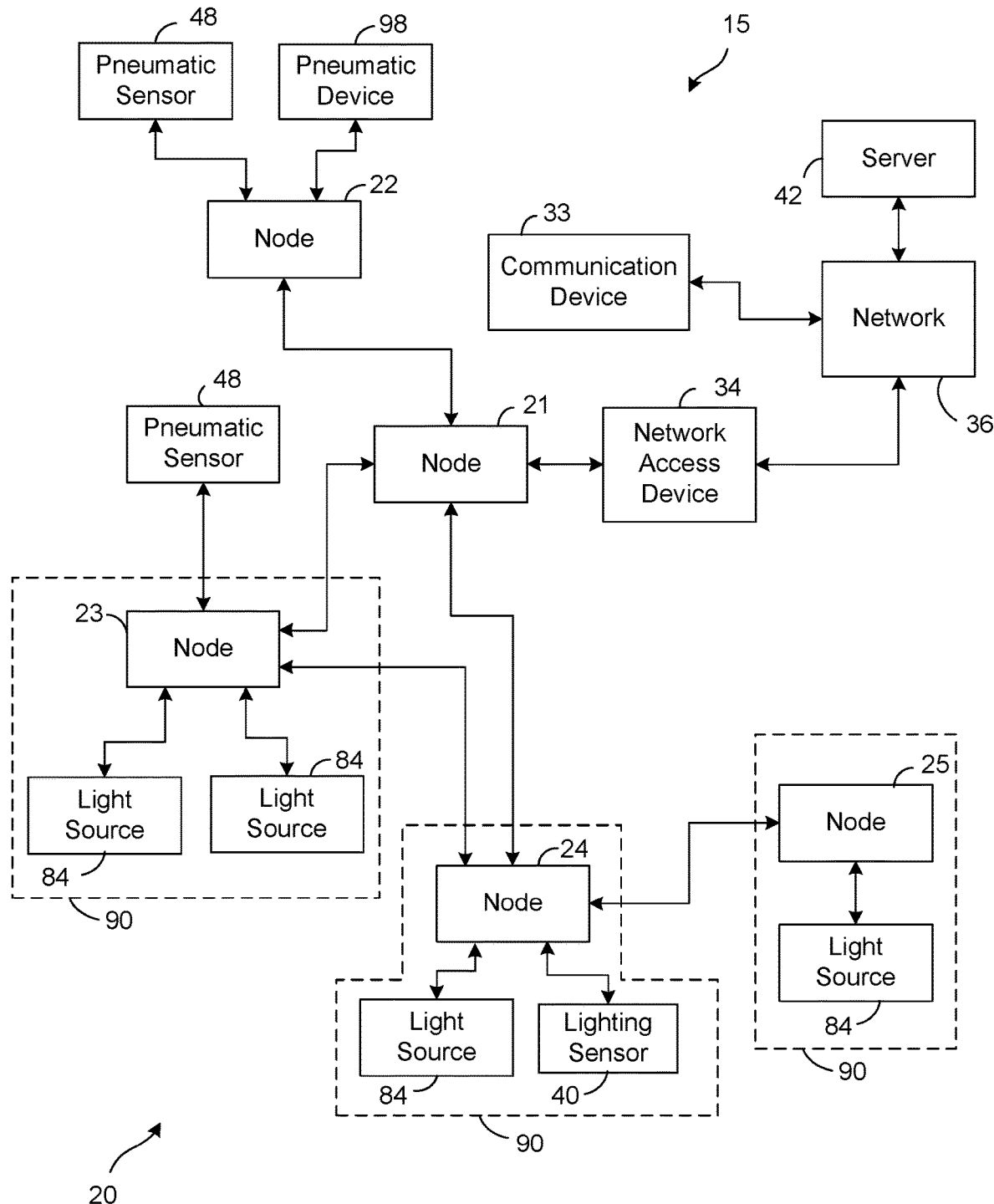
FIG. 1 is a block diagram showing an embodiment of a control system.

FIG. 1 shows an embodiment of a control system 15 at a facility such as a manufacturing plant, office, factory or warehouse. As shown by FIG. 1, the system 15 can include a wireless sensor network 20. In one embodiment, the network 20 can be implemented as a mesh network, but other types of networks may be implemented in other embodiments. Some examples of networks that can be used with the present application are described in: commonly-assigned U.S. Pat. No. 7,970,871, entitled "Systems and Methods for Dynamically Configuring Node Behavior in a Sensor Network," and granted on Jun. 28, 2011; and commonly-assigned U.S. Pat. No. 9,619,989, entitled "Asset Tracking Systems and Methods," and granted on Apr. 11, 2017, both of which patents are incorporated herein by reference.

The network 20 can include nodes 21-25 to facilitate communication between a server computer 42 and components of the control system 15. In one embodiment, the nodes 21-25 of the control system 15 can be initially configured as a lighting control system to control components of a lighting system at the facility. In other embodiments, the nodes 21-25 of the control system can be initially configured as a pneumatic control system to monitor and control components of a pneumatic system at the facility or an asset tracking system to locate and identify assets (e.g., people and/or objects) in the facility. An example of an asset tracking system that can be used with the present application is described in: commonly-assigned U.S. Pat. No. 9,619,989, entitled "Asset Tracking Systems and Methods," and granted on Apr. 11, 2017. Regardless of the initial configuration of the nodes 21-25 of the control system 15, the nodes 21-25 of the control system 15 can be configured for operation in one or more of the lighting control system, the pneumatic control system, the asset tracking system, or any combination thereof.

In one embodiment, the lighting control system and the pneumatic control system can each be separate sub-systems of the control system 15 with separate components that operate in conjunction with one another. In another embodiment, the lighting control system and the pneumatic control system may use common components (e.g., nodes 21-25) and/or may have common control aspects. For example, the pneumatic control system may be incorporated within the lighting control system such that the systems are able to use some of the same components.

As shown in FIG. 1, the components of the control system 15 (including the lighting control system and the pneumatic control system) can include light sources 84, lighting sensors 40, pneumatic sensors 48, pneumatic devices 98, communication devices 33 and any other components used with a lighting control system or a pneumatic control system. The lighting sensors 40 can include any combination of optical sensors, proximity sensors, infrared sensors, magnetic sensors, touch sensors, height sensors, temperature sensors, pressure sensors, occupancy sensors or any other appropriate type of sensor. In the embodiment of FIG. 1, five nodes 21-25, four light sources 84, one lighting sensor 40, two pneumatic sensors 48, one communication device 33, and one pneumatic device 98 are depicted for simplicity, but the network 20 may have any number of nodes 21-25, any number of light sources 84, any number of lighting sensors 40, any number of pneumatic sensors 40, any number of communication devices 33, and any number of pneumatic devices 98 in other embodiments.

Each node 21-25 is able to communicate with any of the other nodes 21-25. In one embodiment, the nodes 21-25 can communicate among one another wirelessly (i.e., via electromagnetic or acoustic waves carrying a signal), but it is possible for any of the nodes 21-25 to communicate over a conductive medium (e.g., a wire or fiber, or otherwise). In some embodiments, the nodes 21-25 form a mesh network, and messages may hop from node-to-node in order to reach a destination. In the embodiment shown by FIG. 1, nodes 21, 23 and 24 are within range of each other such that any of the nodes 21, 23 and 24 can communicate directly with any of the other nodes 21, 23 and 24. However, node 22 is only within range of node 21 and node 25 is only within range of node 24. Nodes 23-25 can use node 21 to route or otherwise transmit a message to node 22 and nodes 21-23 can use node 24 to route or otherwise transmit a message to node 25.

At least one of the nodes 21-25 can be communicatively coupled to a network access device 34 through which the nodes 21-25 communicate in order to access a network 36, such as a local area network (LAN), wide area network (WAN) or the Internet. The network access device 34 can interface messages between the protocol of the network 20 and the protocol of the network 36. The server 42 can be connected to the network 36 to communicate with the nodes 21-25 and components of the network 20 via the network access device 34. The server 42 can be provisioned to know the network configuration, including the network address or identifier of the nodes 21-25, the light address or identifier of the light sources 84, the pneumatic device address or identifier of the pneumatic devices 98, the pneumatic sensor address or identifier of the pneumatic sensors 48, the communication device address or identifier of the communication devices 33 and any other nodes of the network 20. In other embodiments, the server 42 may be configured to dynamically learn the network configuration.

As shown in the embodiment of FIG. 1, the nodes 23-25 can each be coupled to one or more light sources 84 thereby forming a lighting module 90. The light sources 84 generate light that is used to illuminate the area surrounding the light sources 84. In some embodiments, the light source 84 is assembled into a lamp for use with a lighting fixture. As an example, the light source 84 may be implemented by an incandescent bulb, a light emitting diode (LED), or a fluorescent light, or other types of light sources that are assembled into lamps for use in lighting fixtures. Yet other types of light sources are possible in other embodiments.

The nodes 23-25 can be used to control the lighting state (e.g., the on-state or the off-state), the lighting output aperture position (e.g., all light can exit or a reduced quantity of light can exit), and/or the lighting output intensity (e.g., a high intensity output or a low intensity output) of the corresponding connected light source(s) 84. In addition, the lighting modules 90 may include one or more reflectors that can be adjusted by the nodes 23-25 to change the direction of the light output by the light source 84. Further, the lighting modules 90 may include one or more mechanisms (e.g., a track and motorized trolley) for the light source 84 to permit the position and/or orientation of the light source 84 to be adjusted by the nodes 23-25.

In one embodiment, the nodes 21-25, light sources 84, lighting sensors 40, pneumatic sensors 48, and pneumatic devices 98 can be stationary. However, in other embodiments, one or more of the nodes 21-25, one or more of the light sources 84, one or more of the lighting sensors 40, one or more of the pneumatic sensors 48, and/or one or more of the pneumatic devices 98 may be mobile. Each node 21-25, light source 84, lighting sensor 40, pneumatic sensor 48, and pneumatic device 98 may be positioned at a specific location within the facility. In one embodiment, the light sources 84 of the lighting modules 90 can be mounted in the ceiling of the facility. However, in other embodiments, the light sources 84 can be mounted in other locations in the facility such as on the walls, under cabinets, in the floor or in any other suitable location. Each node 21-25 may be assigned to a specific location within a facility (e.g., a particular room or area of a building).

The system 15 can further include at least one communication device 33 that can wirelessly communicate directly with network 36 and server 42. In another embodiment, the communication device 33 can wirelessly communicate with the nodes 21-25 as the communication device 33 is moved through the area(s) of the facility. The communication device 33 can be carried by a person and can be used by the system 15 to track the movements of the person through the facility. The communication device 33 can be used by the person to interact with the lighting control system and/or the pneumatic control system of the control system 15 and/or a software application for providing an enhanced experience in the facility. In one embodiment, the communication device 33 can include one or more processors to execute instructions for controlling the operation of the communication device 33. In addition, the communication device 33 can have a communication module for communicating wirelessly with network 36 and/or nodes 21-25, a location tracking system (e.g., a global positioning system (GPS)) to determine the location of the communication device 33, and a power supply, such as a battery, to provide electrical power to the components of the communication device 33. The communication device 33 can have an input/output (I/O) interface, such as, for example, a touch screen display of a smart phone or tablet computer, or a mouse, keyboard, and monitor of a laptop computer, that permits the user to input data into the communication device 33 and receive data from the communication device 33.

Figure 2:
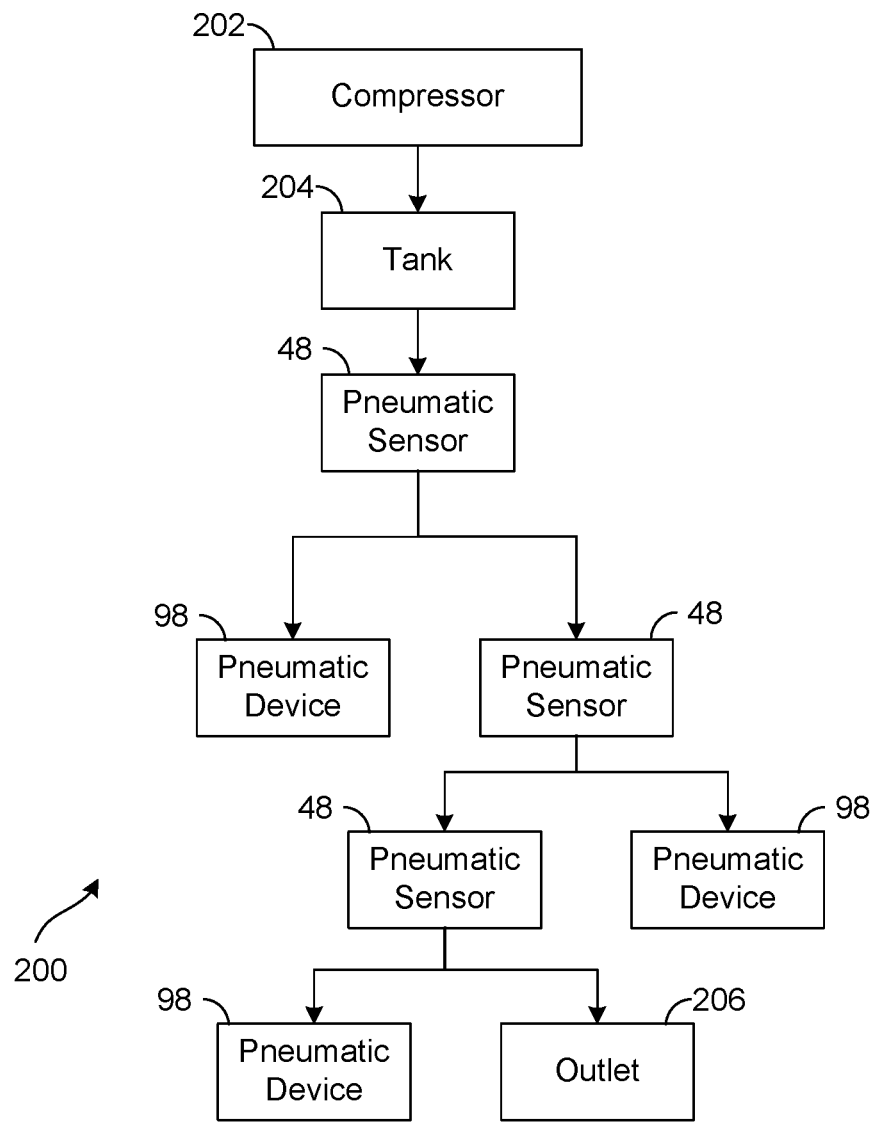
FIG. 2 is a block diagram showing an embodiment of a pneumatic system.

FIG. 2 depicts an embodiment of a compressed gas system or pneumatic system that can be used at a facility such as a manufacturing plant, office, factory or warehouse. The pneumatic system 200 can include a compressor 202 to compress (i.e., increase the pressure of) a gaseous fluid. In one embodiment, the fluid can be air, but other types of gases or fluids (e.g., inert gases) can be used in other embodiments. The compressor 202 can receive air (or other gas) from a return line and/or from the surrounding environment (e.g., the atmosphere). The compressor 202 can increase the pressure of the received air from a first pressure (e.g., ambient or atmospheric air pressure) to a second preselected pressure that is greater than the first pressure. The compressed air from the compressor 202 can be provided to and stored in a tank 204 until needed by the components of the pneumatic system 200. The tank 204 can be used to maintain the compressed air at the second preselected pressure and provide the compressed air to the pneumatic devices 98 and/or other components of the pneumatic system 200. While not shown in FIG. 2, the pneumatic system 200 may include other components (e.g., valves) to provide for appropriate operation of the pneumatic system 200.

The tank 204 can be connected to the pneumatic devices 98 and air outlets 206 of the pneumatic system 200 by suitable connections, conduits, pipes, ducts, etc., to permit flow of the compressed air between the tank 204 and the pneumatic devices 98 and the outlets 206. In addition, pneumatic sensors 48 can be positioned at predetermined locations within the pneumatic system 200 to measure parameters associated with the performance and/or operation of the pneumatic system 200. In the embodiment of FIG. 2, one compressor 202, one tank 204, three pneumatic sensors 48, three pneumatic devices 98 and one outlet 206 are depicted for simplicity, but the pneumatic system 200 may have any number of compressors 202, any number of tanks 204, any number of pneumatic sensors 48, any number of pneumatic devices 98 and any number of outlets 206 in other embodiments.

In one embodiment, pneumatic devices 98 can include manufacturing equipment (e.g., automation/robotic systems, painting systems, injection molding systems, and food and beverage processing system) or other equipment (e.g., abrasive blasting systems) that require a compressed air source. In one embodiment, the compressor 202 and tank 204, while shown as separate components in FIG. 2, may be considered pneumatic devices 98 and communicate with the nodes 21-25 of the network 20. In another embodiment, the pneumatic devices 98 (including the compressor 202 and the tank 204) may include one or more pneumatic sensors 48 to provide information regarding the operation and/or performance of the corresponding pneumatic devices 98.

In one embodiment, outlet 206 can include any suitable connection mechanism to permit portable pneumatic equipment or devices (e.g., power tools such as air hammers, drills and wrenches or medical/dental tools) to be connected to the pneumatic system 200 and receive compressed air from the pneumatic system 200. In an embodiment, pneumatic sensors 48 can include flow sensors, pressure sensors, temperature sensors, current sensors, voltage detectors, infrared sensors, or any other suitable type of sensors to measure parameters that can be used to evaluate the performance or operation of pneumatic devices 98 and/or the pneumatic system 200. In one embodiment, the pneumatic sensors 48 can be used to measure parameters associated with the flow of compressed air in the pneumatic system 200. The pneumatic sensors 48 used to measure flow can be located internal to, external to, or in-line with the connections between the compressor 202, the tank 204 and the pneumatic devices 98 or outlets 206.

Figure 3:
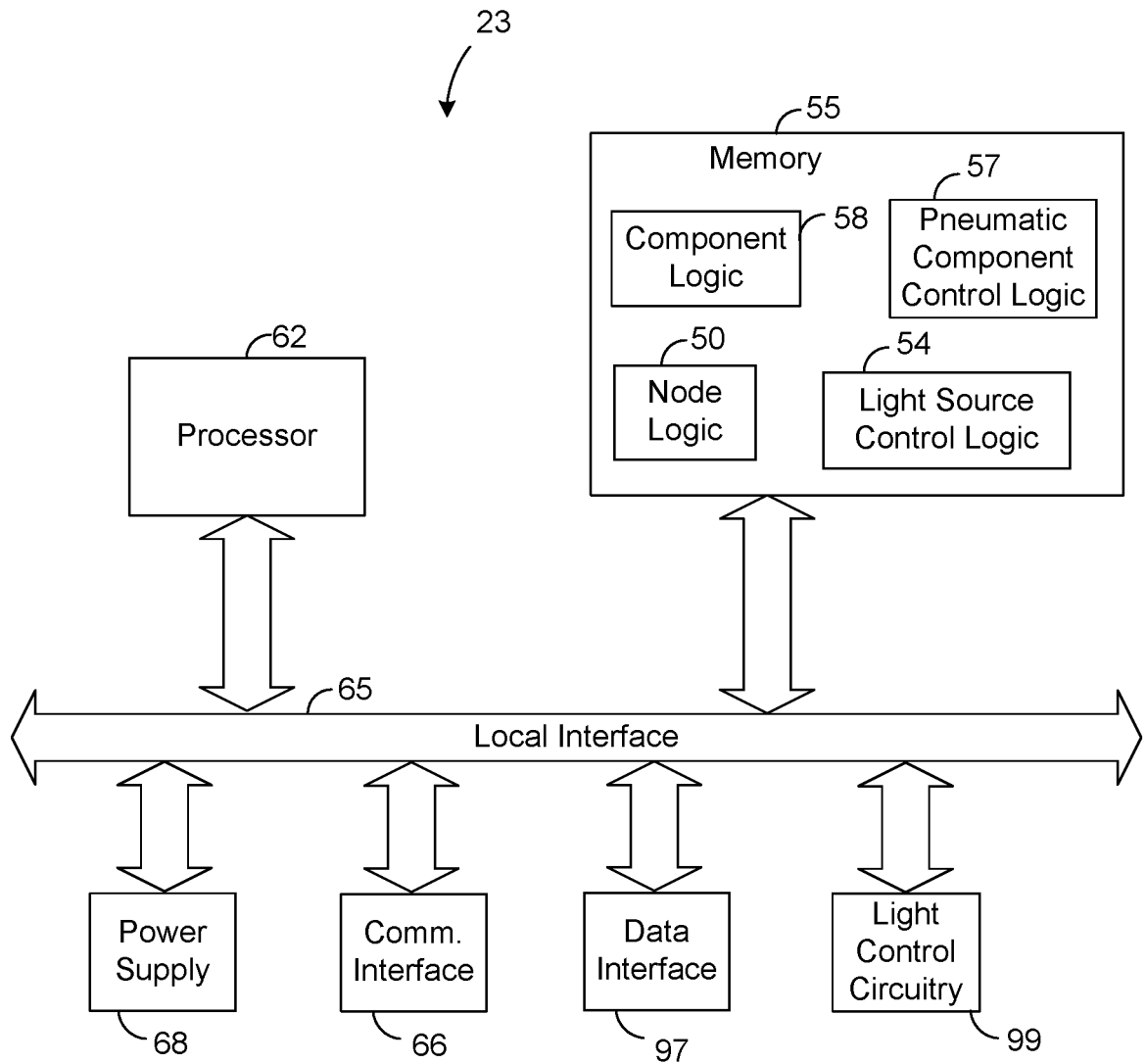
FIG. 3 is a block diagram showing an embodiment of a network node used with the control system.

FIG. 3 depicts an embodiment of one of the nodes used in network 20. Note that any of the other nodes may be configured similarly or identical to the node depicted by FIG. 3. The node 23 shown by FIG. 3 can include logic 50, referred to herein as "node logic," for generally controlling the operation of the node 23. The node 23 also includes logic 54, referred to herein as "light source control logic," for controlling the light sources 84 connected to the node 23, logic 57, referred to herein as "pneumatic component control logic," for controlling the pneumatic sensors 48 and/or pneumatic devices 98 connected to the node 23 and, if desired, component logic 58 for controlling any component (e.g., lighting sensor 40) that may be connected to the node 23. In other embodiments, the component logic 58 and/or the pneumatic component control logic 57 can be combined with light source control logic 54 to control light sources 84, pneumatic sensors 48, pneumatic devices 98 and/or components. The node logic 50, component logic 58, the pneumatic component control logic 57 and the light source control logic 54 may be implemented in software, firmware, hardware, or any combination thereof. In FIG. 3, the node logic 50, the component logic 58, the pneumatic component control logic 57 and the light source control logic 54 are implemented in software and stored in memory 55. However, other configurations of the node logic 50, the component logic 58, the pneumatic component control logic 57 and the light source control logic 54 are possible in other embodiments.

Note that the node logic 50, the component logic 58, the pneumatic component control logic 57 and the light source control logic 54, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The node 23 includes at least one conventional processor 62, which includes processing hardware for executing instructions stored in the memory 55. As an example, the processor 62 may include a central processing unit (CPU) or a digital signal processor (DSP). The processor 62 communicates to and drives the other elements within the node 23 via a local interface 65, which can include at least one bus.

The node 23 also has a communication interface 66. The communication interface 66 includes a radio frequency (RF) radio or other device for communicating wirelessly. Using the communication interface 66, the node 23 may communicate with a pneumatic sensor 48, a pneumatic device 98, another node 21, 22, 24, 25, a lighting sensor 40, a light source 84, a communication device 33 or a network access device 34.

The node 23 can have a power supply 68, which provides electrical power to the components of the node 23 and possibly to the light source 84, pneumatic sensor 48 and/or lighting sensor 40. In one embodiment, the power supply 68 has an interface that allows it to plug into or otherwise interface with an external component, such as a wall outlet or battery, and receive electrical power from such external component. If desired, the power supply 68 may incorporate one or more batteries to permit the node 23 to be independent of the external power component.

The node 23 can also have light control circuitry 99 that is connected, either wired or wirelessly, to the light source 84 to control the light source 84. If a node is connected to more than one light source 84 (e.g., node 23), then the light control circuitry 99 can either have separate circuits for each light source 84 or the light control circuitry 99 can use circuits that can control multiple light sources 84. The light control circuitry 99 may include a switch and/or light driver through which current from power supply 68 is provided to the light source 84. Alternatively, the light control circuitry 99 may control a switch and/or light driver located near the light source 84 to permit current from a light source power supply to reach the light source 84. In one embodiment, the switch can be manually controlled and can be mounted in the vicinity of the light source 84, such as on the wall of a room containing the light source 84. The light source 84 can convert the current received through the switch into visible light for illuminating the area in close proximity to the light source 84. The light source control logic 54 can be used to control the light control circuitry 99 to obtain desired performance from the light source 84.

Figure 4:
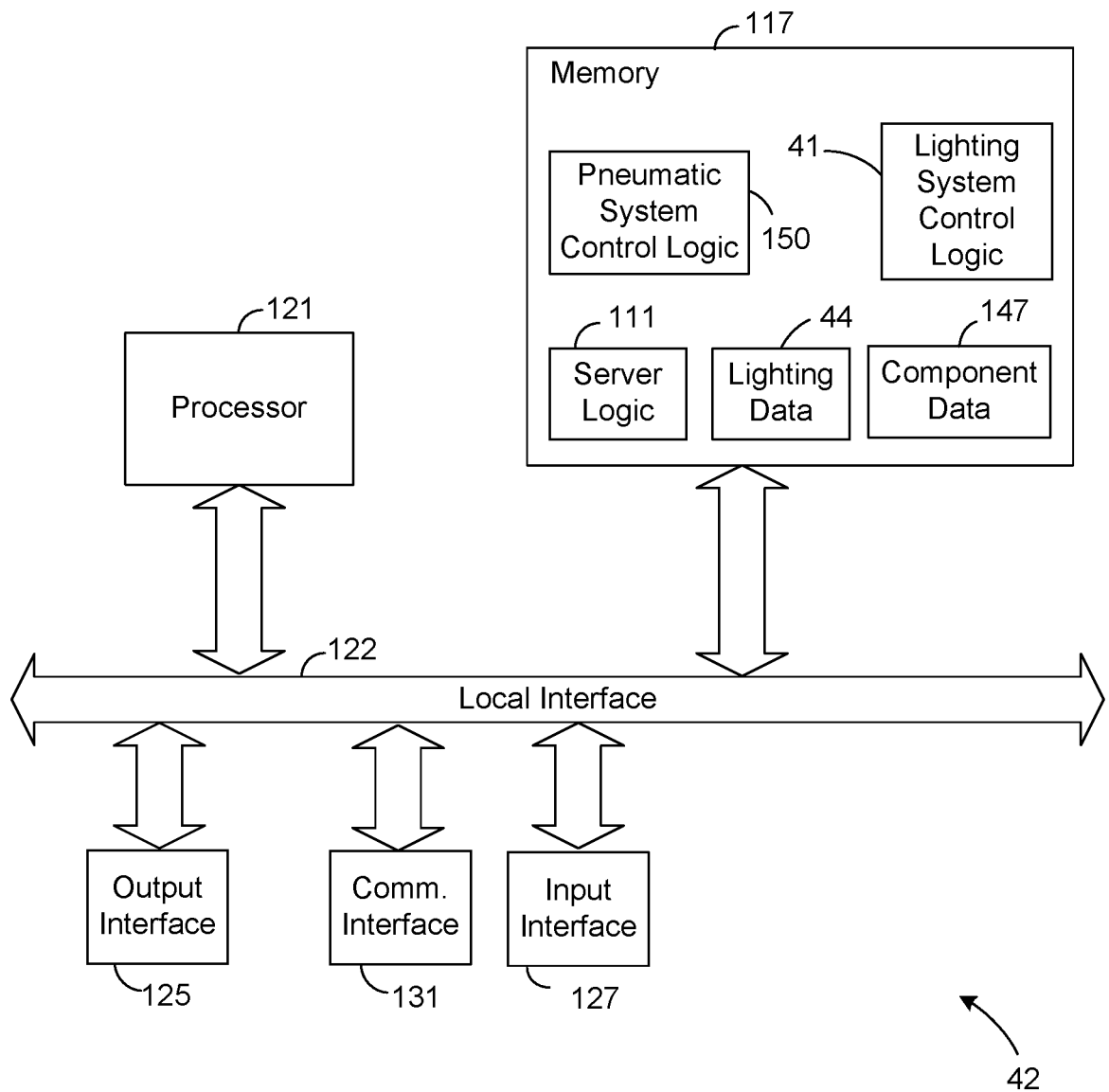
FIG. 4 is a block diagram showing an embodiment of a server used with the control system.

FIG. 4 shows an embodiment of the server 42. The server 42 can include logic 111, referred to herein as "server logic," for generally controlling the operation of the server 42, including communicating with the nodes 21-25 of the network 20. The server 42 includes logic 41, referred to herein as "lighting system control logic" to control the lighting modules 90 and the light sources 84, and logic 150, referred to herein as "pneumatic system control logic," to control the components of the pneumatic system 200. The server logic 111, the pneumatic system control logic 150, and the lighting system control logic 41 can be implemented in software, hardware, firmware or any combination thereof. In the server 42 shown in FIG. 4, the server logic 111, the pneumatic system control logic 150, and the lighting system control logic 41 are implemented in software and stored in memory 117 of the server 42. Note that the server logic 111, the pneumatic system control logic 150, and the lighting system control logic 41, when implemented in software, can be stored and transported on any non-transitory computer-readable medium for use by or in connection with an instruction execution apparatus that can fetch and execute instructions.

The server 42 can include at least one conventional processor 121, which has processing hardware for executing instructions stored in memory 117. As an example, the processor 121 may include a central processing unit (CPU) or a digital signal processor (DSP). The processor 121 communicates to and drives the other elements within the server 42 via a local interface 122, which can include at least one bus. Furthermore, an input interface 127, for example, a keypad, keyboard or a mouse, can be used to input data from a user of the server 42, and an output interface 125, for example, a printer, monitor, liquid crystal display (LCD), or other display apparatus, can be used to output data to the user. Further, a communication interface 131 may be used to exchange data with the network 36.

The node 23 may further have a data interface 97 for connecting to and/or communicating with external components, such as a pneumatic sensor 48 or a pneumatic device 98. Note that it is unnecessary for the node 23 to have all of the components shown. As an example, if the node 23 is only connected to a light source 84 and is not connected to a pneumatic sensor 48 or pneumatic device 98, it is unnecessary for the node 23 to have the pneumatic component control logic 57. In another example, if the node 23 is not connected to a light source 84, it is unnecessary for the node 23 to have the light source control logic 54 or the light control circuitry 99.

As shown by FIG. 4, lighting data 44, and component data 147 can be stored in memory 117 at the server 42. The component data 147 can include sensor data from lighting sensors 40 and/or pneumatic sensors 48 and/or information or data from pneumatic devices 98 for use and/or analysis by server logic 111, pneumatic system control logic 150, and/or lighting system control logic 41. In one embodiment, the data from the pneumatic sensors 48 and the information or data from pneumatic devices 98 can be stored in memory 117 as pneumatic data (not shown) for use and/or analysis by the pneumatic system control logic 150 or the lighting system control logic 41.

The lighting data 44 can indicate one or more parameters for each lighting module 90 in the system 15. In this regard, each lighting module 90 can be identified in the lighting data 44 by the module's respective network identifier for the network 20 (i.e., the network address for the node 23-25) or other unique identifier. For each lighting module 90, the lighting data 44 can identify the number of light sources 84 associated with the lighting module 90 and indicate an identifier for each light source 84. If a lighting module 90 is limited to a single light source 84 or a single light identifier, then the network identifier may be used as the light identifier. In one embodiment, the server logic 111 can transmit messages with information relating to the lighting data 44 to the lighting modules 90 over the network 20. Additional information regarding the operation of a lighting control system is described in commonly-assigned U.S. Pat. No. 9,374,874, entitled "Lighting Control Systems and Methods," and granted on Jun. 21, 2016, which patent is incorporated herein by reference.

The pneumatic system control logic 150 can be used to analyze and process the data from the pneumatic sensors 48 (e.g., flow measurements) and the information or data from pneumatic devices 98 stored in component data 147 or pneumatic data. The pneumatic system control logic 150 can use the data and information from the pneumatic sensors 48 and/or the pneumatic devices 98 to monitor and/or control the operation of the pneumatic system 200. For example, the pneumatic system control logic 150 can use the data and information from the pneumatic sensors 48 and the pneumatic devices 98 to identify problems with the components of the pneumatic system 200 (e.g., a fault occurring at the compressor 202 or a leak occurring in the pneumatic system 200). In addition, the pneumatic system control logic 150 can use the data and information from the pneumatic sensors 48 and the pneumatic devices 98 to control the capacity (or operation) of the compressor 202 in response to changing load conditions in the pneumatic system 200 (e.g., increase capacity of the compressor 202 in response to high demand in the pneumatic system 200). In one embodiment, the pneumatic system control logic 150 can be used to determine the presence of leaks in the pneumatic system 200 and provide information to a user regarding the location of the leaks based on the data and information from the pneumatic sensors 48 and the pneumatic devices 98.

Figure 5:
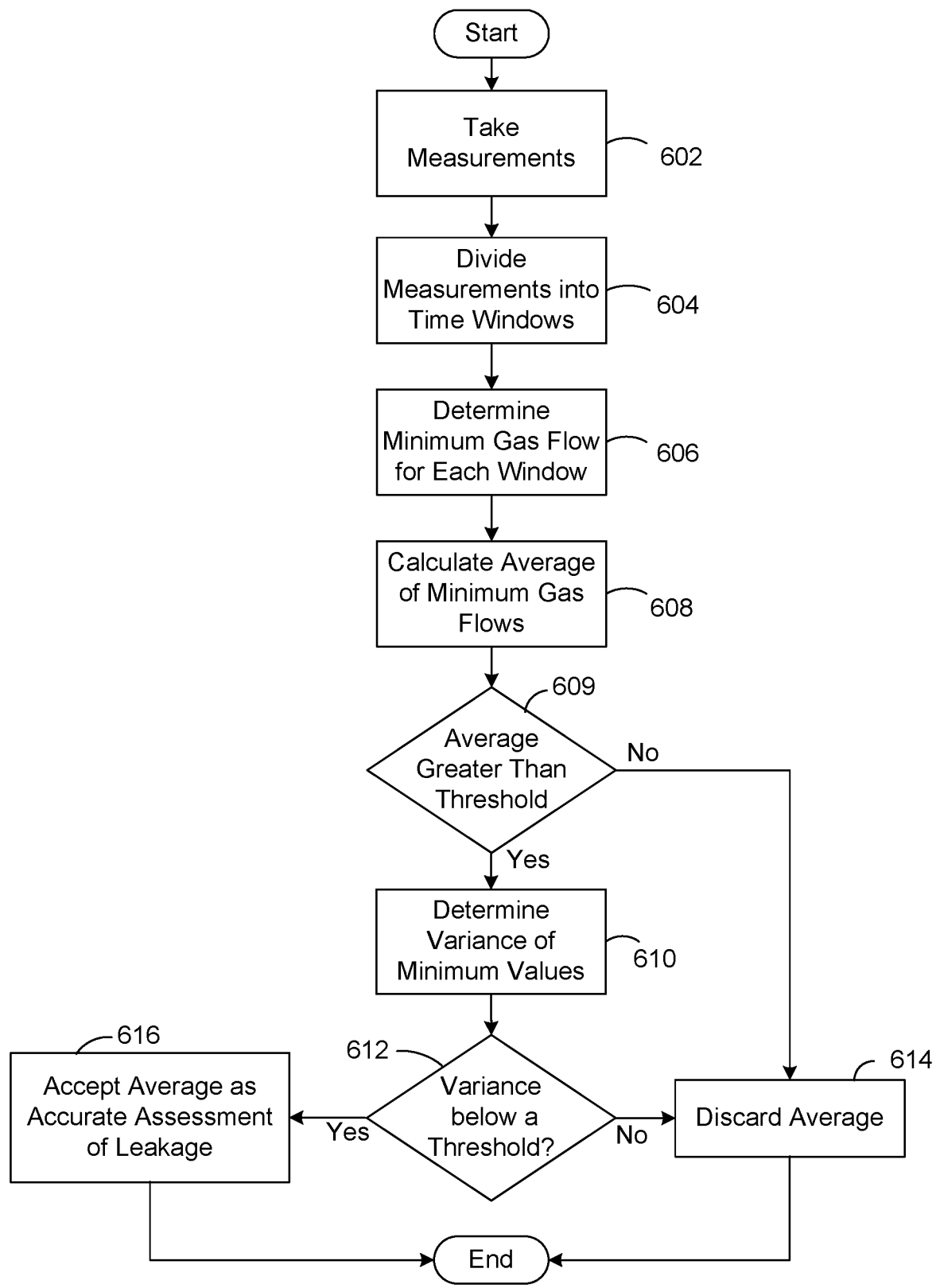
FIG. 5 is a flow chart showing an embodiment of a process for determining the presence of a leak in a compressed gas system.

FIG. 5 is a flow chart showing an embodiment of a process for determining the presence of a leak in a compressed gas system of a facility. The process begins with the pneumatic sensors 48 taking a plurality of measurements that are indicative of the gas flow in the compressed gas system (step 602). In one embodiment, the pneumatic sensors 48 can measure the gas flow at a predetermined interval (e.g., every second). However, in other embodiments, the pneumatic sensors 48 can continuously measure the gas flow or the pneumatic sensors 48 can measure the gas flow in response to the occurrence of predetermined events (e.g., a signal or instruction from the server computer 42). The pneumatic sensors 48 can then provide the plurality of measurements to the server computer 42 via network 20. The plurality of measurements can be provided to the server computer 42 as the measurements are captured by the pneumatic sensors 48 or the plurality of measurements can be provided to the server computer 42 at preselected times or intervals.

After receiving the measurements from the pneumatic sensors 48, the server computer 42 can store the information in memory 117 (either as component data 147 or pneumatic data). Once the server computer 42 has received measurements over a predetermined time period (e.g., 1 hour, 1 day, 1 week, etc.), the server computer 42 can divide the measurements from each of the pneumatic sensors 48 during the predetermined time period into a plurality of time windows (step 604). In other words, the measurements from each of the pneumatic sensors 48 can be organized into corresponding time windows based on when the measurement was taken by the pneumatic sensor 48. The time windows can be correlated to a portion of the predetermined time period such that the plurality of time windows encompass the predetermined time period. In one embodiment, the time windows can have a fixed duration (i.e., each time window is for the same length of time), while, in other embodiments, the time windows can have a variable duration (i.e., one time window can have a different length of time than another time window). In another embodiment, the time windows for the measurements from the pneumatic sensors 48 can be the same (i.e., the time windows used to divide the measurements from two pneumatic sensors 48 are the same), while, in other embodiments, the time windows for the measurements from the pneumatic sensors 48 can be different (i.e., the time windows used to divide the measurements from two pneumatic sensors 48 are different).

Once the measurements from each of the pneumatic sensors 48 have been divided into time windows, the server computer 42 can determine the minimum gas flow for each time window (step 606) for each pneumatic sensor 48 based on the measurements included within the time window. The server computer 42 can then calculate an average minimum gas flow for each pneumatic sensor 42 over the predetermined time period (step 608) based on the minimum gas flow determinations from the time windows. In one embodiment, Equation 1 can be used to determine the average minimum gas flow for a pneumatic sensor 48 located near an "edge" or termination point of the compressed gas system.

$$\text{average\_min\_gas\_flow} = \qquad (1)$$
$$\text{mean}\Big[\min\{\alpha_{t_n} \ldots \alpha_{t_{n+900}}\}_{n=0}, \min\{\alpha_{t_n} \ldots \alpha_{t_{n+900}}\}_{n=901} \ldots ,$$
$$\min\{\alpha_{t_n} \ldots \alpha_{t_{n+900}}\}_{n=1week}\Big]$$

where $\alpha$ is the flow of gas in CFM (cubic feet per minute), and the time window is between $t_n$ and $t_{n+900}$ for different values of n.

In another embodiment, Equation 2 can be used to determine the average minimum gas flow for a pneumatic sensor 48 located at an intermediate point of the compressed gas system. Since the pneumatic sensor 48 is located at an intermediate point in the compressed gas system, the minimum flow determination may account for the minimum flows in each of the branches that are downstream from the intermediate pneumatic sensor 48 in order to be able to determine if there is a leak in the vicinity of the intermediate pneumatic sensor 48.

$$\text{average\_min\_gas\_flow} = \qquad (2)$$
$$\text{mean}\Bigg[\min\{\alpha_{t_n} \ldots \alpha_{t_{n+900}}\}_{n=0} - \sum_{k=1}^{N} \min\{\alpha^k_{t_n} \ldots \alpha^k_{t_{n+900}}\}_{n=0}, \ldots ,$$
$$\min\{\alpha_{t_n} \ldots \alpha_{t_{n+900}}\}_{n=1week} - \sum_{k=1}^{N} \min\{\alpha^k_{t_n} \ldots \alpha^k_{t_{n+900}}\}_{n=1week}\Bigg]$$

where $\alpha$ is the flow of gas in CFM, k is an identifier associated with a downstream pneumatic sensor, and the time window is between $t_n$ and $t_{n+900}$ for different values of n.

The server computer 42 can then compare the average minimum gas flow for each pneumatic sensor 48 to a predetermined gas flow threshold value (step 609). In one embodiment, the predetermined gas flow threshold value can be zero, but may be a value greater than zero in other embodiments. The average minimum gas flow can be compared to the threshold value to determine if there is a sufficient non-zero gas flow that may be indicative of a leak being present in the compressed gas system in the vicinity of the pneumatic sensor 48. If the average minimum gas flow is zero or less than the threshold value, the average minimum gas flow determination can be discarded (step 614) because there is no constant flow in the compressed gas system, which indicates that there is no leak, or there is insufficient flow in the compressed gas system to affirmatively indicate a leak and the process can end.

If the average minimum gas flow is greater than zero or the threshold value, the variance between the minimum gas flows can then be determined (step 610). The variance can be used to confirm that the determined average minimum gas flow is the result of a leak and not an anomaly in the compressed gas system that altered the results (e.g., an unusually high minimum gas flow from a time window). In one embodiment, the variance can be determined as the difference between the highest and lowest values for the minimum gas flows from the time windows. However, in other embodiments, the variance can be determined as a difference between a mean or median value and the highest and lowest values for the minimum gas flows from the time windows.

The determined or calculated variance can then be compared to a predetermined threshold value (step 612). In one embodiment, the predetermined threshold value can be a predetermined percentage of the mean or median value for the minimum gas flows, but other threshold values can be used in other embodiments. If the determined variance is greater than the threshold value, then the process discards the average minimum gas flow determination (step 614) because it may not be a reliable indication of a gas leak and the process ends. However, if the determined variance is less than the threshold value, the process accepts the average minimum gas flow as being an accurate indication or assessment of a gas leak in the compressed gas system (step 616). Once a leak is determined, the server computer 42 can notify a user of the gas leak and provide the user with general vicinity of the gas leak based on the pneumatic sensor 48 that provided the measurements that resulted in the leak determination.

In an embodiment, the process of FIG. 5 can be continuously performed or executed by the server computer 42. The server computer 42 can re-execute the process immediately after completing the process or the server computer 42 can execute the process on a predetermined time interval (e.g., daily, weekly, monthly, etc.). In other embodiments, the server computer 42 can execute the process in response to a user command or in response to the occurrence of a preselected event. In addition, the server computer 42 may reuse measurements from the pneumatic sensors 48 in determining the presence of a leak in the compressed gas system. For example, if the predetermined time period used for generating the time windows is one week and the process is executed daily, the server computer 42 can supplement the most recent measurements (e.g., from the last day) with the measurements from previous days in order to have sufficient measurements for the predetermined time period. The server computer 42 may store previously calculated results in order to simplify processing of the information. Alternatively, the server computer 42 may only use measurements that have not been previously processed when determining the presence of a gas leak in the compressed gas system. If only unprocessed measurements are used by the server computer 42, the predetermined time period (for the time windows) can correspond to the frequency with which the process is executed.

In one embodiment, the server 42 may use a machine learning algorithm to analyze the gas flow data for the pneumatic system 200 and determine when and where a gas leak may be present in the pneumatic system 200. As known in the art, machine learning algorithms generally involve training a computer through the use of artificial intelligence by analyzing sample data sets to recognize data patterns that likely result in certain outputs or outcomes. Such machine learning algorithms may be used by the server 42 to learn air flow patterns or usages that correspond to the presence of a gas leak in the pneumatic system 200. For example, the machine learning algorithm may identify a pattern of gas flow that corresponds to a gas leak in the pneumatic system 200. In still other embodiments, other evaluations can be performed on the gas flow data to determine a gas leak in the pneumatic system 200.

Figure 6:
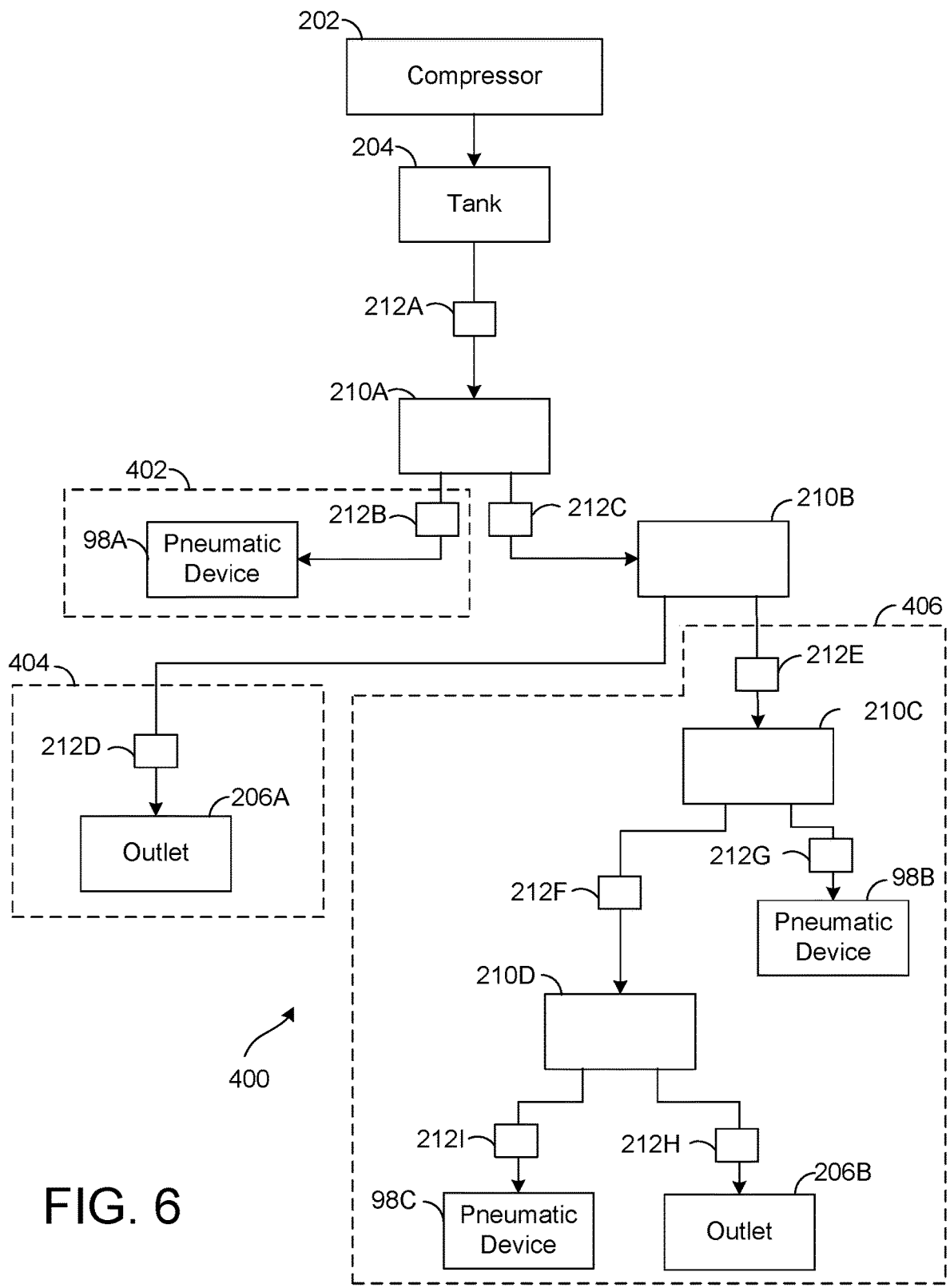
FIG. 6 is a block diagram showing an embodiment of a compressed gas system divided into portions.

In an embodiment, the process of FIG. 5 (or portions thereof) can be used to determine the gas leakage associated with specific departments or areas of the facility. The compressed gas system can be configured such that portions of the compressed gas system are correlated to specific departments or areas in the facility. FIG. 6 shows an embodiment of a compressed gas system 400. The compressed gas system 400 can have a compressor 202 and a tank 204. The tank 204 can be used to supply compressed gas to the components (e.g., pneumatic devices 98A-98C and outlets 206A-206B) of the compressed gas system 400 via a plurality of branched connections 210A-210D and a plurality of flow paths (i.e., the paths having corresponding flow sensors 212A-212I).

As shown in FIG. 6, the compressed gas system 400 can be divided into three portions 402-406 based on the location of branched connections 210A-210B in the compressed gas system 400. In other words, when the gas flow from the tank 204 branches into different paths (i.e., the paths having flow sensors 212B-212E) via a branched connection 210A-210B, each of the different paths can be used to supply a different area of the facility and can be used to define a portion 402-406 of the compressed gas system 400. For example, portion 402 can be supplied by the flow path including flow sensor 212B, portion 404 can be supplied by the flow path including flow sensor 212D and portion 406 can be supplied by the flow path including flow sensor 212E. In an embodiment, the gas flow from the tank 204 may have to branch several times before the gas flow in a branch can be correlated to a specific department of the facility such as occurs for portions 404-406.

As an example, to determine the gas leakage in portion 406 of the compressed gas system 400 associated with a corresponding department or area of the facility, the branch (i.e., the flow path including flow sensor 212E) in the compressed gas system 400 supplying the portion of the compressed gas system 400 has to be identified. Next, flow measurements can be taken from each of the flow sensors 212E-212I located downstream of the identified branch. The flow measurements taken by the flow sensors 212E-212I downstream of the identified branch can be analyzed to determine the amount gas leakage associated with the portion 406 of the compressed gas system 400 and thus, the gas leakage associated with the corresponding department of the facility. In one embodiment, a leakage amount can be determined using the process of FIG. 5 and totaled for each of the flow sensors 212E-212I located downstream of the identified branch to obtain the total leakage of the portion 406 of the compressed gas system 400. The total leakage can be calculated by adding the gas leakage calculated (using Equation 1) for downstream flow sensors 212G-212I located at the edges of the portion 406 of the compressed gas system 400 associated with the department and the gas leakage calculated (using Equation 2) for upstream flow sensors 212E-212F located at intermediate points (but not upstream of the identified branch) of the portion 406 of the compressed gas system 400 associated with the department.

In another embodiment, the gas leakage for the portion 406 of the compressed gas system 400 can be calculated by identifying the first downstream flow sensor 212E from the identified branch and calculating the gas leakage using Equation 1 with the process of FIG. 5 even if there are additional flow sensors 212F-212I located in the portion 406 of the compressed gas system 400 corresponding to the department. In other words, the first downstream flow sensor 212E from the identified branch can be defined as the edge of the portion 406 of the compressed gas system 400 for purposes of determining the gas leakage in the portion 406 of the compressed gas system 400 associated with the department.

Note that the network formed by the nodes connected to the light sources 84, referred to hereafter as "lighting nodes," may be used by the nodes connected to the pneumatic sensors 48 or pneumatic devices 98, referred to hereafter as "pneumatic nodes," to communicate with the server 42. As an example, the lighting nodes may be installed for the purpose of controlling light sources 84 in an efficient manner. Once the costs of installing the lighting nodes have been incurred, these lighting nodes may be leveraged as a communication backbone to enable communication with the server 42 for nodes used for other applications, such as the nodes used for sensing leaks or asset tracking, as described herein.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A method for determining gas leakage from a compressed gas system in a facility, the method comprising:
   identifying a portion of the compressed gas system;
   identifying at least one sensor in the identified portion of the compressed gas system;
   measuring a parameter with the identified at least one sensor a plurality of times to generate a plurality of measured parameters, wherein each measured parameter of the plurality of measured parameters corresponds to a flow of compressed gas through the identified at least one sensor;
   dividing the plurality of measured parameters into a plurality of time windows, wherein each time window of the plurality of time windows includes two or more measured parameters;
   selecting a gas flow for each time window of the plurality of time windows based on a comparison of the two or more measured parameters included in the time window;
   generating a gas flow parameter based on the selected gas flows from the plurality of time windows; and
   determining a gas leakage for the identified portion of the compressed gas system based on the generated gas flow parameter.

2. The method of claim 1, wherein:
   the identifying at least one sensor includes identifying at least one first sensor located at an edge of the identified portion of the compressed gas system and identifying at least one second sensor located at an intermediate point of the identified portion of the compressed gas system upstream from the at least one first sensor; and
   wherein each time window of the plurality of time windows includes a measured parameter from each of the identified at least one first sensor and the identified at least one second sensor.

3. The method of claim 1, wherein the generating the gas flow parameter includes calculating an average gas flow for the selected gas flows from the plurality of time windows.

4. The method of claim 1, wherein the selecting the gas flow for each time window of the plurality of time windows includes determining a minimum gas flow from the two or more measured parameters included in the time window.

5. A method for determining gas leakage from a compressed gas system in a facility, the method comprising:
   identifying a portion of the compressed gas system;
   identifying at least one sensor in the identified portion of the compressed gas system;
   measuring a parameter with the identified at least one sensor a plurality of times to generate a plurality of measured parameters, wherein each measured parameter of the plurality of measured parameters corresponds to a flow of compressed gas through the identified at least one sensor; and
   calculating a gas leakage for the identified portion of the compressed gas system based on the plurality of measured parameters from the identified at least one sensor, wherein calculating the gas leakage further comprises:
      dividing the plurality of measured parameters from the at least one sensor into a plurality of time windows, wherein each time window of the plurality of time windows includes at least one measured parameter;
      determining a minimum gas flow for each time window of the plurality of time windows for the at least one sensor based on the at least one measured parameter included in the time window;
      calculating an average minimum gas flow for the at least one sensor based on the determined minimum gas flows from the plurality of time windows; and determining the gas leakage for the identified portion of the compressed gas system based on the calculated average minimum gas flow for the at least one sensor.

6. A control system for a facility, comprising:

a plurality of nodes connected together in a network;

a plurality of sensors connected to the plurality of nodes, each sensor of the plurality of sensors configured to measure a parameter corresponding to a flow of compressed gas in an area of a compressed gas system in the facility; and a server connected to the plurality of nodes and configured to receive the measured parameters from the plurality of sensors, the server comprising at least one processor and at least one memory coupled to the at least one processor, the at least one memory configured to store control instructions, wherein the control instructions, when executed by the at least one processor, cause the at least one processor to:

divide the plurality of measurements into a plurality of time windows;

determine a minimum flow of compressed gas for each time window of the plurality of time windows;

calculate an average minimum flow of compressed gas based on the determined minimum flows of compressed gas for each time period; and determine a gas leak in the compressed gas system based on the calculated average minimum flow of compressed gas.

7. The control system of claim 6, wherein the control instructions cause the at least one processor to notify a user in response to the determination of the gas leak in the compressed gas system.

8. The control system of claim 6, wherein the control instructions cause the at least one processor to compare the calculated average minimum flow of compressed gas to a predetermined threshold to determine the gas leak in the compressed gas system.

9. The control system of claim 8, wherein the control instructions cause the at least one processor to determine a variance for the determined minimum flows of compressed gas for each time window in response to the calculated average minimum flow of compressed gas being greater than the predetermined threshold.

10. The control system of claim 9, wherein the predetermined threshold is a first predetermined threshold and the control instructions cause the at least one processor to compare the determined variance to a second predetermined threshold to determine the gas leak in the compressed gas system.

11. The control system of claim 10, wherein the gas leak is determined in the compressed gas system in response to the determined variance being less than the second predetermined threshold.

12. The control system of claim 6, wherein the plurality of nodes is configured to communicate messages for at least one of a lighting control system or an asset tracking system.

13. The control system of claim 6, wherein the control instructions cause the at least one processor to determine a location for the gas leak in response to the determination of the gas leak in the compressed gas system.

14. A method for determining a gas leak in a compressed gas system of a facility, the method comprising:

measuring a parameter with a sensor a plurality of times to generate a plurality of measured parameters, wherein each measured parameter of the plurality of measured parameters corresponds to a flow of compressed gas in the compressed gas system of the facility;

dividing the plurality of measured parameters into a plurality of time windows, wherein each time window of the plurality of time windows includes at least one measured parameter;

determining a minimum gas flow for each time window of the plurality of time windows based on the at least one measured parameter included in the time window;

calculating an average minimum gas flow based on the determined minimum gas flows from the plurality of time windows; and determining whether a gas leak is present in the compressed gas system based on the calculated average minimum gas flow.

15. The method of claim 14, wherein the determining whether the gas leak is present includes comparing the calculated average minimum gas flow to a predetermined threshold.

16. The method of claim 15, wherein the determining whether the gas leak is present includes determining the gas leak is present in the compressed gas system in response to the average minimum gas flow being greater than the predetermined threshold.

17. The method of claim 15, wherein the predetermined threshold is a first predetermined threshold and the determining whether the gas leak is present includes:

determining a variance for the determined minimum gas flows from the plurality of time windows; and comparing the determined variance to a second predetermined threshold.

18. The method of claim 17, wherein the determining whether the gas leak is present includes determining the gas leak is present in the compressed gas system in response to the determined variance being less than the second predetermined threshold.

19. The method of claim 14, wherein the measuring the parameter with the sensor a plurality of times includes measuring the parameter with the sensor the plurality of times over a predetermined time period.

20. The method of claim 19, wherein the dividing the plurality of measured parameters into a plurality of time windows includes correlating each time window of the plurality of time windows to a portion of the predetermined time period.

21. The method of claim 20, wherein the plurality of time windows is equally spaced in the predetermined time period.

22. The method of claim 14, further comprising determining a location for the gas leak in the compressed gas system based on a location of the sensor in the compressed gas system in response to the determination the gas leak is present in the compressed gas system.

* * * * *